United States Patent
Anastasijevic et al.

(10) Patent No.: US 8,764,861 B2
(45) Date of Patent: Jul. 1, 2014

(54) PROCESS AND PLANT FOR REFINING OIL-CONTAINING SOLIDS

(75) Inventors: Nikola Anastasijevic, Altenstadt (DE); Guenter Schneider, Lorsch (DE); Michael Missalla, Oberursel (DE)

(73) Assignee: Outotec Oyj, Espoo (FI)

( * ) Notice: Subject to any disclaimer, the term of this patent is extended or adjusted under 35 U.S.C. 154(b) by 1197 days.

(21) Appl. No.: 12/668,778

(22) PCT Filed: Jun. 24, 2008

(86) PCT No.: PCT/EP2008/005078
§ 371 (c)(1),
(2), (4) Date: Jan. 12, 2010

(87) PCT Pub. No.: WO2009/010157
PCT Pub. Date: Jan. 22, 2009

(65) Prior Publication Data
US 2010/0187161 A1    Jul. 29, 2010

(30) Foreign Application Priority Data
Jul. 13, 2007  (DE) .......................... 10 2007 032 683

(51) Int. Cl.
*C10K 3/06*     (2006.01)
(52) U.S. Cl.
USPC .......................................................... 48/211
(58) Field of Classification Search
None
See application file for complete search history.

(56) References Cited

U.S. PATENT DOCUMENTS

| | | | |
|---|---|---|---|
| 3,093,571 A | 6/1963 | Fish et al. | |
| 3,481,720 A | 12/1969 | Bennett | |
| 4,180,455 A | 12/1979 | Taciuk | |
| 4,210,491 A * | 7/1980 | Schulman | 201/2.5 |
| 4,285,773 A | 8/1981 | Taciuk | |
| 4,306,961 A | 12/1981 | Taciuk | |
| 4,404,083 A * | 9/1983 | Vasalos | 208/410 |
| 4,507,195 A | 3/1985 | Spars et al. | |
| 4,563,264 A * | 1/1986 | Weiss et al. | 208/407 |
| 5,607,577 A | 3/1997 | Koszarycz et al. | |
| 7,135,151 B1 | 11/2006 | Palmas | |
| 2005/0118076 A1 | 6/2005 | Lomas | |
| 2006/0231459 A1 | 10/2006 | Swan et al. | |

FOREIGN PATENT DOCUMENTS

| | | |
|---|---|---|
| CA | 1121749 A1 | 4/1982 |
| EP | 0028666 A1 | 5/1981 |
| EP | 1015527 A1 | 7/2000 |
| WO | 2006131506 A1 | 12/2006 |

OTHER PUBLICATIONS

International Search Report dated Feb. 13, 2009 issued in connection with PCT/EP2008/005078.

\* cited by examiner

*Primary Examiner* — Imran Akram
(74) *Attorney, Agent, or Firm* — Leydig, Voit & Mayer, Ltd.

(57) ABSTRACT

A process for refining oil-containing includes introducing the oil-containing solids to a reactor so as to expel an oil-containing vapor from the solids at a temperature of 300 to 1000° C. The oil-containing vapor expelled from the reactor is supplied to a cracker so as to crack heavy oil components of the oil-containing vapor. The cracked heavy oil components obtained in the cracker are separated and withdrawn from the cracker. The solids left in the reactor and an unevaporated fraction of heavy hydrocarbons are introduced into a furnace. The unevaporated fraction of heavy hydrocarbons in the furnace are burned at a temperature of 600 to 1500° C. The solids from the furnace are recirculated into the reactor. A conveying gas is supplied into a rising pipe, wherein the stream of solids withdrawn from the furnace is fluidized by the conveying gas and transported to the reactor through the rising pipe.

16 Claims, 2 Drawing Sheets

PROCESS AND PLANT FOR REFINING OIL-CONTAINING SOLIDS

CROSS REFERENCE TO PRIOR APPLICATIONS

This application is a U.S. National Phase application under 35 U.S.C. §371 of International Application No. PCT/EP2008/005078, filed on Jun. 24, 2008 and which claims benefit to German Patent Application No. 10 2007 032 683.3, filed on Jul. 13, 2007. The International Application was published in English on Jan. 22, 2009 as WO 2009/010157 A2 under PCT Article 21(2).

FIELD

The present invention relates to a process and a plant for refining solids containing oil and/or bitumen, in particular oil sand or oil shale.

BACKGROUND

Oil or tar sands are black sand formations chiefly dating from the Mesozoic, which are spread worldwide and have a mineral oil content of about 5 to 18%. In contrast to liquid petroleum, the oil sands are thickly viscous and must first be separated from the sand and be processed to crude oil. In the regions near the surface, the oil sand is recovered by strip mining by means of huge bucket-wheel and dragline excavators and ground to a grain size <30 μm. The heavy oil is extracted by means of hot water and steam, wherein at the top a suspension with organic phase is accumulated. The lower part is separated and repurified. Therefore, much water is required for oil recovery, which in addition is discharged not quite oil-free.

Oil shale refers to mountain-forming formations of marl or other types of clayey bituminous sediment rock from various geological eras, which are rich in organic matter (kerogen) from fossilized microorganisms or from pollen. The recovery of oil from oil shale traditionally is effected by mining and subsequent pyrolysis (carbonization at 500° C.). Alternatively, underground recovery (in situ) is used by injecting a steam-air mixture into the rock, which was previously loosened by blasting, and igniting a flame front which expels the oil.

The recovery of crude oil from oil sands or oil shale is thus relatively cost-intensive. With rising petroleum prices, the recovery of crude oil from oil sands and oil shale, however, becomes increasingly interesting in economic terms. A problem in the present recovery of oil from oil sands and tar sands is the necessary high consumption of water and the emission of waste waters containing residual oil.

U.S. Pat. No. 4,507,195 describes a process for coking contaminated oil shale or tar sand oil on solids distilled in retorts. The hydrocarbonaceous solids are mixed with a hot heat-transfer material in order to raise the temperature of the solids to a temperature suitable for the pyrolysis of the hydrocarbons. The mixture is kept in the pyrolysis zone, until a sufficient quantity of hydrocarbon vapors is released. In the pyrolysis zone a stripping gas is passed through the mixture in order to lower the dew point of the evolved hydrocarbon vapors and to entrain the fine particles. Accordingly, a mixture of contaminated hydrocarbon vapors, stripping gas and entrained fine particles is obtained from the pyrolysis zone. From the contaminated hydrocarbon vapors, a heavy fraction is separated and thermally cracked in a fluidized bed consisting of the fine particles, whereby the impurities along with the coke are deposited on the fine particles in the fluidized bed. The product oil vapors are withdrawn from the coking tank. As heat-transfer material, recirculated pyrolyzed oil shale or tar sand is used, which has been passed through a combustion zone, in order to burn off carbon residues and provide the heat for the pyrolysis of the raw material. Since there is no pressure seal between the combustion zone and the pyrolysis furnace, the oxidizing atmosphere of the combustion zone can enter the pyrolysis furnace and impair the quality of the oil vapor. In addition, thermal cracking in the coking tank consumes much energy and therefore is expensive.

EP 1 015 527 B1 describes a process for the thermal treatment of feedstock containing volatile, combustible constituents, wherein the feedstock is mixed with hot granular solids from a collecting bin in a pyrolysis reactor in which relatively high temperatures exist. In the reactor, cracking reactions in the gases and vapors should be caused thereby.

Beside the thermal cracking used in the above-mentioned processes, catalytic cracking processes are also known. In Fluid Catalytic Cracking (FCC), the heavy distillate of a refinery is broken down into gases, liquefied gases and gasolines, preferably into long-chain n-alkanes and i-alkanes. Cracking generally is effected at temperatures between 450 and 550° C. and a reactor pressure of 1.4 bar by means of an alumosilicate-based zeolite catalyst. FCC crackers are described, for example, in U.S. Pat. No. 7,135,151 B1, US 2005/0118076 A1 and US 2006/0231459 A1. An exemplary catalyst is disclosed in WO 2006/131506 A1.

SUMMARY

An aspect of the present invention is to provide a more efficient process for recovering crude oil from oil-containing solids.

In an embodiment, the present invention provides a process for refining oil-containing solids. The process includes introducing the oil-containing solids to a reactor so as to expel an oil-containing vapour from the solids at a temperature of 300 to 1000° C. The oil-containing vapour expelled from the reactor is supplied to a cracker so as to crack heavy oil components of the oil-containing vapour. The cracked heavy oil components obtained in the cracker are separated and withdrawn from the cracker. Solids remaining in the reactor and including an unevaporated fraction of heavy hydrocarbons are introduced into a furnace. The unevaporated fraction of heavy hydrocarbons in the furnace are burned at a temperature of 600 to 1500° C. The solids are recirculated from the furnace into the reactor. An oxidizing atmosphere of the furnace is separated from an atmosphere of the reactor by a blocking device between the furnace and the reactor. The blocking device includes a downpipe through which a stream of solids is withdrawn from the furnace, and includes a rising pipe branched off from the downpipe in an upward direction in a vicinity of a bottom of the downpipe. A conveying gas is supplied into the rising pipe so as to fluidize the stream of solids withdrawn from the furnace and transport the stream of solids to the reactor through the rising pipe.

BRIEF DESCRIPTION OF THE DRAWINGS

The present invention is described in greater detail below on the basis of embodiments and of the drawings in which.

DETAILED DESCRIPTION

Figure 1:
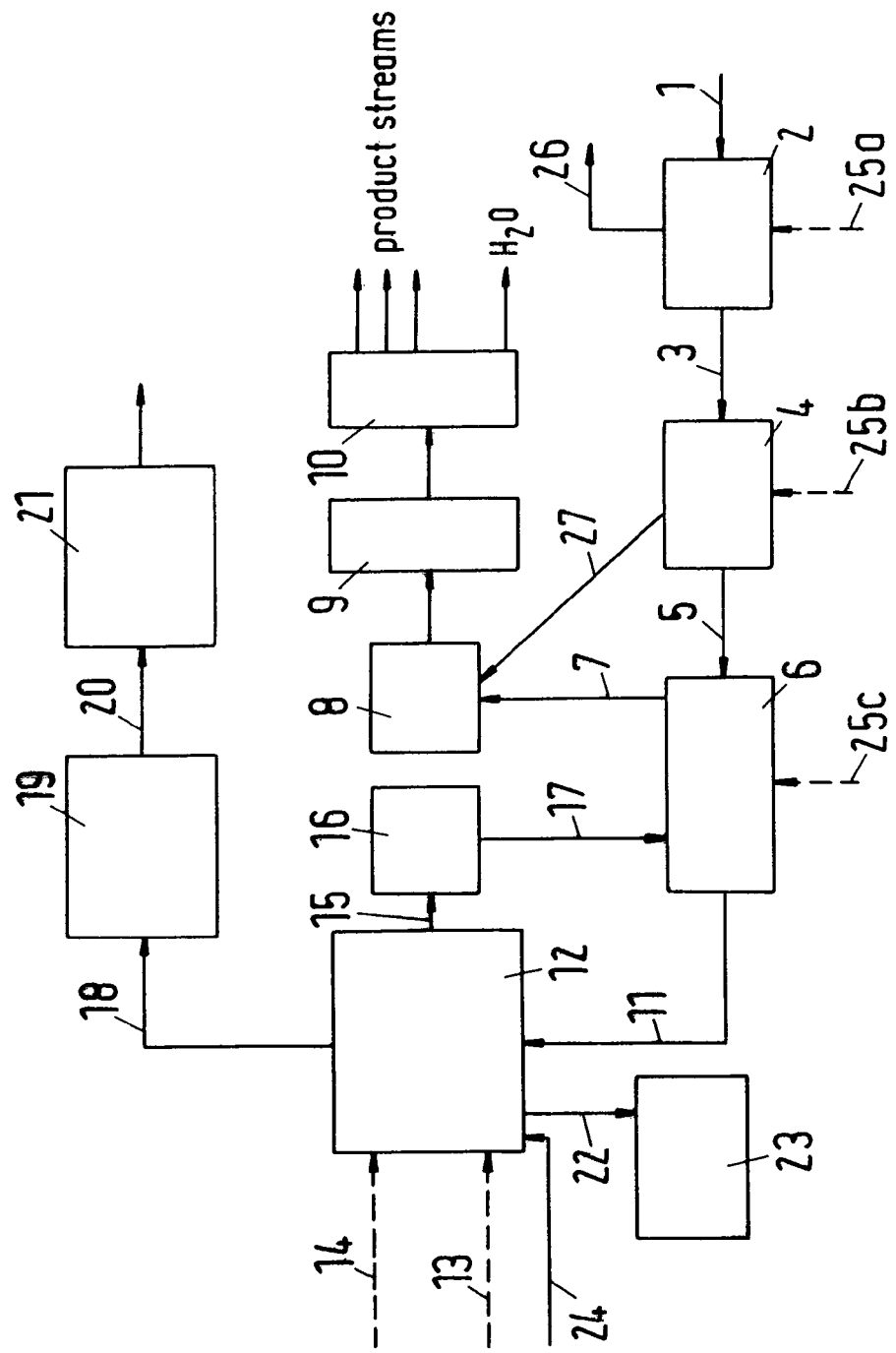
FIG. 1 schematically shows a plant for performing the process of the present invention, FIG. 2 schematically shows a blocking device arranged between the furnace and the reactor.

In an embodiment of the present invention, the oil contained in the oil-containing solids is volatilized in the reactor for 50% to 90%, for example, 70% to 80%, and supplied to the cracker, in particular to an FCC cracker. Here, the heavy oil components are broken down into light oil components. The remaining oil content or oil product content left in the solids is burnt in the furnace in order to generate the heat required in the reactor, which is transferred to the reactor via the solids withdrawn from the furnace. Between the furnace and the reactor, a seal is provided in order to separate the oxidizing atmosphere of the furnace from the distillation section and avoid an oxidation, combustion or even explosion of the oil vapors generated in the reactor. By using a catalytic cracker, the amount of light oils in the product streams can be increased with lower energy consumption as compared to normal cracking.

In an embodiment of the present invention, the oil-containing solids are dried in a one- or multistage drier at a temperature of 80 to 120° C. before being introduced into the reactor. With minimum loss of oil, the water content thereby should largely be removed from the oil-containing solids. The gas stream withdrawn from the drier can be supplied to the furnace as an additional fuel. Alternatively, the ultralight hydrocarbons contained therein can, for example, be separated by distillation and be utilized as product. Alternatively, the water then can also be supplied to a waste water treatment plant.

To minimize the mass flow of the heat transfer medium recirculated from the furnace into the reactor, an embodiment of the present invention provides for preheating the possibly predried oil-containing solids in a one- or multistage preheater to a temperature of 110 to 300° C. The amount of heat to be supplied to the reactor in addition thereby is reduced correspondingly. A fluidized bed with steam as heat transfer medium or a molten-salt reactor can be used as preheater. The heat can also be transferred indirectly.

The reactor serves, for example, to obtain the distillative expulsion of the oil contained in the possibly predried and preheated solids. For optimizing the heat transfer from the calcined material recirculated from the furnace to the preheated oil-containing solids, a circulating fluidized bed, a stationary fluidized bed, an annular fluidized bed or a transport or flash reactor can for instance be used.

In an embodiment of the present invention, the fluidization of the reactor can be effected by means of gas streams, which are obtained from a preheating stage and/or the cracker and contain light hydrocarbons. Nitrogen, hydrogen, carbon dioxide, gas mixtures containing air or oxygen, or part of the waste gas from the furnace can, however, also be supplied to the reactor as fluidizing gas. The air or the oxygen here can be used for adjusting or initiating a partial combustion for adaptation of the temperature or yield. If hydrogen is also used for the fluidization, the cracking of the heavy hydrocarbons can be promoted thereby. It is also possible to perform the fluidization by means of an inert gas such as nitrogen.

The fluidizing gases can be supplied to the reactor cold or preheated.

To raise the efficiency, the reactor can be operated under a reduced pressure in the range from 0.001 to 1 bar. Lowering the pressure promotes the expulsion of the oil from the solids.

Since the gas streams withdrawn from the reactor and the preheater still contain fine solid particles, the gas streams are passed through a dedusting means in accordance with the present invention before being introduced into the cracker.

Cracking can preferably be effected in an FCC cracker at a temperature of 400 to 600° C., for example, 450 to 550° C., and at a reactor pressure of 1 to 2 bar, for example, 1.3 to 1.5 bar, by means of an alumosilicate-based zeolite catalyst.

In an embodiment of the present invention, the subsequent separation of the products contained in the cracker is effected in a distillation column from which the product streams such as gasoline, diesel oil, light hydrocarbons, etc. are withdrawn.

The cracking process is promoted in that the gas withdrawn from the reactor is already hot. The cracker can include a circulating fluidized bed, to which the gas stream withdrawn from the reactor is supplied as secondary air, an annular fluidized bed, wherein the gas stream withdrawn from the reactor is supplied via the central tuyère, a stationary fluidized bed, or a flash reactor.

The furnace serves to generate heat for the reactor, wherein the high temperature of, for example, 300 to 800° C., required in the reactor is introduced into the reactor via the solids heated in the furnace. To ensure a complete combustion of the heavy oil components left in the solids or of the oil products, the combustion in the furnace is performed in an atmosphere rich in oxygen in accordance with the present invention, which can be produced by supplying air, air enriched with oxygen or pure oxygen. The combustion gas can be supplied cold or preheated.

What is used as furnace in accordance with the present invention is a circulating fluidized bed, an annular fluidized bed, a stationary fluidized bed, a transport or flash reactor, a rotary kiln or a grid combustion. To increase the energetic efficiency, a staged combustion is preferred. Additional fuel in the form of untreated oil-containing solids, coal, waste materials or the like can be supplied to the furnace.

The temperature in the furnace should be as high as possible, as a higher temperature can thereby be achieved in the reactor, which leads to higher yields. At higher temperatures, however, less oil-containing residual fraction from the reactor will get into the furnace, so that additional fuel is required. The optimum is to be determined by means of the properties of the oil-containing material.

In an embodiment of the present invention, the heat generated in the furnace can be recovered from the waste gas and/or the calcination residue. This can be effected in a way known in principle by means of a heat recovery system, for instance in the form of a fluidized-bed cooler and/or fluidized-bed heater, a heat recovery cyclone, a waste heat boiler or a Venturi/cyclone combination. It is also possible to utilize the heat generated in the furnace for preheating the fluidizing gas streams of the drier, preheater, reactor and/or cracker or for indirectly heating the preheater and/or drier. The heat can also be used for steam recovery.

In an embodiment, the present invention also provides for a plant for refining oil-containing solids, such as oil sand and oil shale, but also oil-containing, granular (and thus fluidizable) wastes, comprising a reactor to which oil-containing solids are supplied, a furnace to which solids coming from the reactor and fuel are supplied, a return conduit through which hot solids produced in the furnace are recirculated to the reactor, a blocking device for separating the gas atmospheres of the furnace and of the reactor, a cracker to which oil-containing vapor expelled from the oil-containing solids in the reactor is supplied and in which the heavy oil components are broken down, and a separating means for separating the products obtained in the cracker.

In an embodiment of the present invention, the plant can also include a drier and a preheater for drying and preheating the introduced solids as well as a dedusting means and/or a heat recovery system.

In an embodiment of the present invention, the blocking device between the furnace and the reactor includes a downpipe through which a stream of solids is withdrawn from the furnace, a rising pipe which is branched off from the downpipe in upward direction close to the bottom of the same, and a conveying gas supply below the rising pipe, wherein the stream of solids withdrawn from the furnace is fluidized by the conveying gas and transported to the reactor through the rising pipe. This provides not only for a control of the mass flow of the heat transfer medium supplied to the reactor, which is controllable via the supply of conveying gas, but also for a reliable pressure seal between the oxidizing atmospheres of the furnace and the reactor. An oxidation, combustion or even explosion of the oil vapors expelled in the reactor can reliably be avoided. Apart from the above-mentioned so-called sealpot construction, there can also be used a lock hopper, a non-return valve or a combination of these elements.

Developments, advantages and possible applications of the present invention can also be taken from the following description of embodiments and the drawing. All features described and/or illustrated per se or in any combination form the subject-matter of the invention, independent of their inclusion in the claims or their back-reference.

A plant for refining oil-containing solids, which is schematically shown in FIG. 1, includes a one- or multistage drier 2, to which oil-containing solids such as oil sand or oil shale are supplied via a supply conduit 1. Via a conduit 3, the dried oil sand or oil shale is supplied to a one- or multistage preheater 4, in which the solids are preheated to a temperature of 150 to 300° C. Via a conduit 5, the solids thus preheated then are supplied to a distillation reactor 6, in which the solids are heated to 600 to 800° C. and thereby a large part of the oil contained in the solids is expelled. Upon passing through a dedusting means 8 (which can be configured as a cyclone, multiclone, filter or a combination thereof), the resulting oil vapor is supplied via a conduit 7 to an FCC cracker 9 with an alumosilicate-based zeolite catalyst. In the cracker 9, the heavy oil components are broken down into light hydrocarbons, which are separated in a succeeding separating means 10, e.g. a distillation column.

The solids left in the reactor 6 upon expulsion of the oil vapors, which still contain an unevaporated fraction of heavy hydrocarbons, are supplied via a conduit 11 to a fluidized-bed furnace 12, to which additional fuel or heat transfer medium for starting up the furnace 12 can be supplied via conduits 13, 14.

Figure 2:
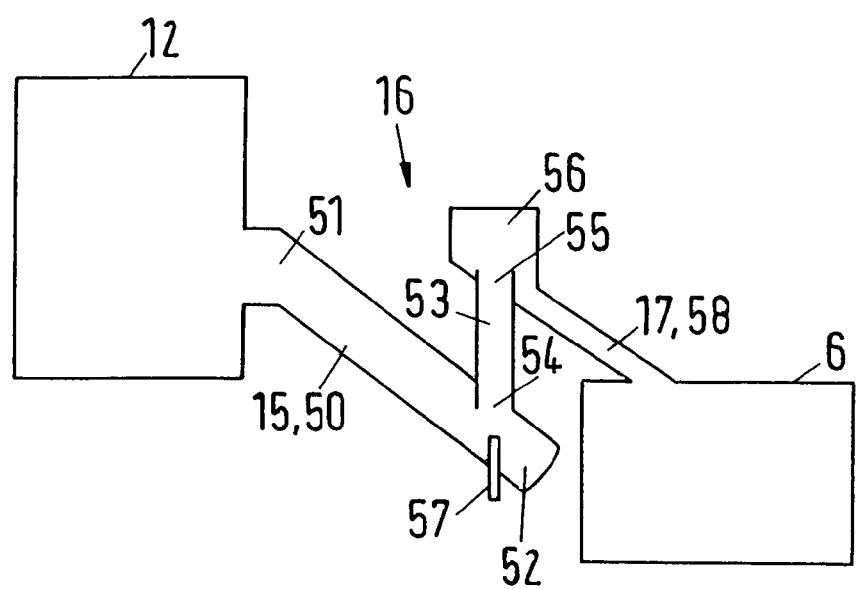

From the furnace 12, a return conduit 15 leads to a blocking device 16 not illustrated in FIG. 2, which is used for separating the furnace and reactor atmospheres and is connected with the reactor 6 via a conduit 17.

The waste gas from the furnace 12 is supplied to a heat recovery system 19 via a conduit 18 and then via a conduit 20 to a gas cleaning 21. The calcination residue of the furnace 12 also is supplied to a heat recovery system 23 via a conduit 22.

Via a conduit 24, hot air obtained in the heat recovery systems 19, 23 can be introduced into the furnace as combustion air.

In FIG. 2, a so-called sealpot is illustrated in detail as an example for a suitable blocking device 16. The descending return conduit 15, which also is referred to as downpipe 50 or downer, through which hot solids are discharged as heat transfer medium for the reactor 6, is branched off from the furnace 12. The inlet region of the downpipe 50 also is referred to as head 51 of the downpipe. Just before the bottom 52 of the downpipe 50, an upwardly directed conduit, which also is referred to as rising pipe 52 or riser, is branched off from the downpipe 50 and extends substantially vertically to the top. The diameter of the downpipe 50 is about twice as great as that of the rising pipe 53. The inlet region or base 54 of the rising pipe 53 can slightly protrude into the downpipe 50 or terminate flush with the wall of the downpipe. At the upper end or head 55 of the rising pipe 53, the rising pipe opens into a discharge pot 56, from which the solids can flow off into the reactor 6 via the conduit 17. At the bottom 52 of the downpipe 50, below the rising pipe base 54, conveying gas is supplied via a tuyère 57 which is connected to a supply conduit 58, in order to fluidize the stream of solids in the rising pipe 53. As fluidizing gas, any suitable conveying gas can be used in principle. Preferably, a third, in particular inert gas, such as nitrogen, is used to ensure the separation of the gas atmospheres between the fluidized bed in the furnace 12 and the head of the rising pipe 53.

The plant for refining oil-containing solids in accordance with the present invention substantially is constructed as described above. In the following, its mode of operation, function and action will be explained.

The ground or unground oil-containing solids supplied via supply conduit 1 are dried and heated to a temperature of 80 to 120° C. in the drier 2, for example, by means of fluidizing air supplied via a fluidizing conduit 25a. The gas stream containing water, vapor and super-light oil components is discharged via a discharge conduit 26 and can be supplied to the furnace 12.

Subsequently, the dried solids are preheated to a temperature of 110 to 300° C. in the preheater 4, which is supplied with fluidizing gas via a fluidizing conduit 25b. The light oil components expelled thereby are introduced into the reactor 6 as fluidizing gas, for instance via a fluidizing conduit 25c, or withdrawn via a discharge conduit 27 and supplied to the cracker 9 upon dedusting. In the reactor 6, the preheated solids are heated to a temperature of 300 to 800° C. by means of the hot solids recirculated from the furnace 12, whereby 70 to 80% of the oil contained in the solids is expelled. The resulting oil vapor is supplied to the dedusting means 8 via conduit 7 and introduced into the FCC cracker 9 upon dedusting, in order to break down the heavy oil components into light hydrocarbons. These hydrocarbons then are separated in the separating means 10 and withdrawn as separate hydrocarbonaceous product streams. The light oil components can be supplied to the heat recovery system 19, 23.

The solids left in the reactor 9 including the unevaporated heavy oil components are introduced into the furnace 12 via the conduit 11 and burnt at a temperature of 1050 to 1200° C. In the process, merely the oil components contained in the solids are burnt and the solids are brought to a high temperature, so that they can serve as heat transfer medium for the reactor 6. These hot solids then are recirculated to the reactor 6 via the return conduit 15, the blocking device 16 and the conduit 17.

EXAMPLE

About 1000 t/h of oil sand with an oil content of 142 t/h were supplied to the drier 2 via conduit 1 and dried at a temperature of 110° C. Via conduit 3, 988 t/h of the remaining solids were supplied to the preheater 4 and preheated there to 200° C. The remaining 986 t/h of solids were introduced into the reactor via conduit 5 and heated to 800° C. The oil vapors with a mass flow of 97 t/h, which were expelled thereby, are supplied to the dedusting means 8 and then to the FCC cracker 9 and the separating means 10. There was obtained a total product stream of 100 t/h. The waste water obtained was supplied to the furnace 12.

The solids withdrawn from the reactor 6 were introduced into the furnace 12 via conduit 11 and heated there to 1050° C. by combustion of the heavy oil components contained in the solids. A solids stream of 2300 t/h was recirculated to the reactor 6 via the return conduit 15, the blocking device 16 and the conduit 17. The remaining solids were withdrawn from the furnace 12 via the conduit 22 and supplied to the heat recovery system 23, from which 850 t/h of solids with a temperature of 80° C. were withdrawn. The waste gas from the furnace 12, which had an oxygen content of 3%, was supplied to the heat recovery system 19 and could be utilized for generating 125 MW of energy. The waste gas of the heat recovery system 19 was supplied to the gas cleaning 21 with a mass flow of 744 t/h and a temperature of 200° C., in order to remove noxious substances such as SO2, NOx or the like.

The present invention is not limited to embodiments described herein; reference should be had to the appended claims.

LIST OF REFERENCE NUMERALS 1 supply conduit
2 drier
3 conduit
4 preheater
5 conduit
6 reactor
7 conduit
8 dedusting means
9 cracker
10 separating means
11 conduit
12 furnace
13 conduit
14 conduit
15 return conduit
16 blocking device
17 conduit
18 conduit
19 heat recovery system
20 conduit
21 gas cleaning
22 conduit
23 heat recovery system
24 conduit
25a-c fluidizing conduits
26 discharge conduit
27 discharge conduit
50 downpipe
51 head of the downpipe
52 bottom of the downpipe
53 rising pipe
54 base of the rising pipe
55 head of the rising pipe
56 discharge pot
57 tuyère
58 supply conduit

The invention claimed is:

1. A process for refining oil-containing solids, the process comprising:
   introducing the oil-containing solids to a reactor so as to expel an oil-containing vapor from the solids at a temperature of 300 to 1000° C.;
   supplying the oil-containing vapor expelled from the reactor to a cracker so as to crack heavy oil-components of the oil-containing vapor;
   separating and withdrawing from the cracker the cracked heavy oil components obtained in the cracker;
   introducing into a furnace solids remaining in the reactor, the solids including an unevaporated fraction of heavy hydrocarbons;
   burning the unevaporated fraction of heavy hydrocarbons in the furnace at a temperature of 600 to 1500° C.;
   recirculating the solids from the furnace into the reactor, wherein, during the recirculating, an oxidizing atmosphere of the furnace is separated from an atmosphere of the reactor by a blocking device between the furnace and the reactor, the blocking device including a downpipe and a rising pipe branched off from the downpipe in an upward direction in a vicinity of a bottom of the downpipe;
   withdrawing a stream of solids from the furnace through the downpipe; and
   supplying a conveying gas into the rising pipe so as to fluidize the stream of solids withdrawn from the furnace and transport the stream of solids to the reactor, the stream of solids traveling inside of the rising pipe.

2. The process recited in claim 1, further comprising drying the oil-containing solids at 80 to 120° C. in at least one drying stage before introducing the oil-containing solids to the reactor.

3. The process recited in claim 1, further comprising preheating the oil-containing solids to a temperature of 110 to 300° C. in at least one preheating stage before introducing the oil-containing solids to the reactor.

4. The process recited in claim 1, wherein the reactor is a fluidized-bed reactor.

5. The process recited in claim 3, further comprising obtaining gas streams containing light hydrocarbons from at least one of the preheating stage and the cracker, and supplying the gas streams containing the light hydrocarbons to the reactor as fluidizing gas.

6. The process recited in claim 5, wherein at least one of nitrogen, air, oxygen, hydrogen and part of a waste gas from the furnace is supplied to the reactor as fluidizing gas.

7. The process recited in claim 5, wherein gas streams supplied to the reactor are cold or preheated.

8. The process recited in claim 1, wherein the oil-containing vapour is expelled from the solids in the reactor by distillation.

9. The process recited in claim 1, wherein the reactor is operated under a pressure of from 0.001 to 1 bar.

10. The process recited in claim 1, further comprising dedusting gas streams before introducing the gas streams into the cracker.

11. The process recited in claim 1, wherein the cracking is performed with a zeolite catalyst at a temperature of 400 to 600° C. and a pressure of 1 to 2 bar.

12. The process recited in claim 1, wherein the separating and withdrawing of the cracked heavy oil components obtained in the cracker is effected in a distillation column.

13. The process recited in claim 1, wherein the burning of the unevaporated fraction of heavy hydrocarbons in the furnace is performed in an atmosphere rich in oxygen.

14. The process recited in claim 1, wherein a staged burning is performed in the furnace.

15. The process recited in claim 1, further comprising supplying additional fuel to the furnace, the additional fuel including at least one of untreated oil-containing solids and coal.

16. The process recited in claim 1, further comprising recovering heat generated in the furnace from at least one of a waste gas of the furnace and a calcination residue.

* * * * *